Dec. 29, 1964  C. W. KNOTT  3,162,969
FISH CATCHER
Filed June 10, 1963

INVENTOR.
CHARLES W. KNOTT
BY H. W. Brelsford
ATTORNEY 3,162,969
FISH CATCHER
Charles W. Knott, Santa Barbara, Calif., assignor to Thomas P. Hart and Napoleon M. Shalhoob, Jr., both of Santa Barbara, Calif.
Filed June 10, 1963, Ser. No. 286,736
5 Claims. (Cl. 43—15)

This invention relates to fishing tackle and has particular reference to a device that is triggered by the biting of a fish to automatically jerk or pull the fishing line to set the hook in the fish.

Many fishing devices have been employed to automatically pull or jerk the line to set the hook. Devices have been mounted on the rod or reel that attempt this result. Others are more massive devices disposed on land or at the surface of the water employing relatively powerful motors. The present invention relates to the type of line jerkers that are secured at the bottom end of the fishing line fairly close to the fish hook. Such devices can act instantly without the time loss present when the entire length of line must be moved. Many modern fishing lines are made of synthetic materials that are highly elastic and a sudden movement of a rod tip, for example, does not move the bottom end of the line but instead merely stretches the line near the rod and this elastic stretching sends a stretching wave down the line with an appreciable time loss before the hook moves.

The present device employs a spring, which is held in a stressed condition by a catch which is triggered or released by a mechanism moved by the fish pulling on the fish hook. The fish hook is connected by a suitable length of line to one end of the device and the other end is connected to the fishing line leading to the fishing rod or to the angler for hand held lines.

It is a general object of the invention to provide an improved fish line jerker actuated by the biting of the fish.

Another object of the invention is to provide a stressed spring fish line jerker employing a simple latch or catch.

Another object is to provide a fish line jerker wherein a bent wire holds a spring in a stressed condition and a tube is employed to receive the wire when the spring is released.

A further object of the invention is to provide a simple catch release or trigger for a stressed spring in a fish line jerker.

Another object is to provide a combined trigger and hook jerker mechanism, that is, a latch release that is engaged by the released spring.

Other objects and advantages will be apparent in the following description and claims considered together with the drawings forming an integral part of this invention, in which:

Figure 1:
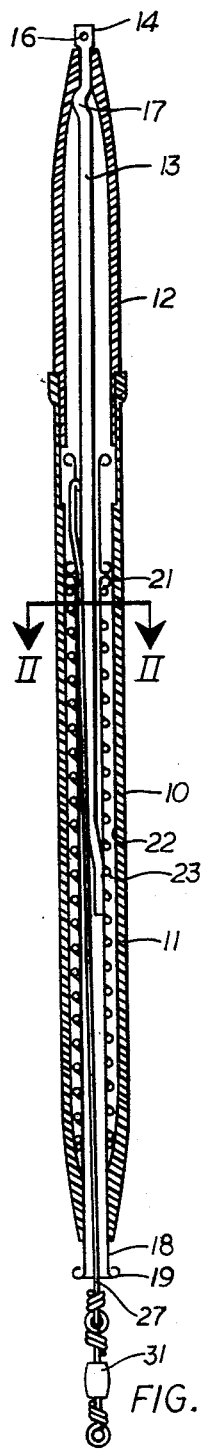
FIG. 1 is an assembly view in full section of a fish catcher embodying the invention, showing a compression spring in its free or released condition.

Referring to the drawings, there is illustrated in FIG. 1 a device embodying the invention wherein an elongated shell 10 has a lower portion 11 which is suitably secured to an upper portion 12. Secured in the upper shell 12 may be a latch member 13 formed of spring wire and this latch member may also be the means of connecting the entire device to a fish line controlled by the fisherman. For this purpose the latch wire 13 passes through the upper end of the shell 12 and is thereafter flattened as at 14 and the hole 16 is punched, drilled or otherwise formed in this flattened upper portion. A kink 17 is permanently formed in the latch wire 13 to form a shoulder which engages the shell 12 so that the wire 13 will not pull out of the shell.

Referring now to the lower shell portion 11, a tube 18 reciprocates therein from a released or telescoped position as shown in FIG. 1 to an extended position or cocked position wherein it projects substantially outside of the shell portion 11. A rolled collar 19 is formed on the lower end of the tube 18 to limit its upward movement, and a rolled collar 21 is formed on the upper end of the tube 18. It will be noted that the interior of the shell portion 11 is substantially cylindrical and this interior is indicated by the reference numeral 22. Disposed between the upper collar 21 on the tube 18 and the bottom end of the shell cavity 22 is a compression spring 23 surrounding the tube 18. This compression spring normally urges the tube 18 into the telescoped position as shown in FIG. 1.

Figure 3:
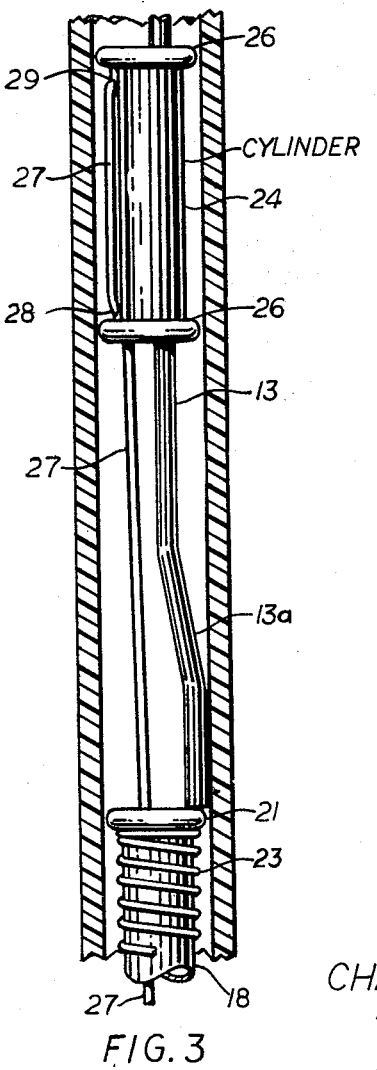
FIG. 3 is an enlarged view in full section of the central portion of FIG. 1 wherein a bent wire catch is holding the compression spring in its compressed condition; and, FIG. 4 is an elevation on an enlarged scale of the upper half of the outer shell of the fish catcher of FIG. 1.

Referring now to FIGS. 1 and 3, it will be noted that a cylinder 24 surrounds the latch wire 13 and is substantially the same interior diameter as the tube 18 and it too may have rolled collars on each end as at 26. Passing through the interior of the tube 18 is a cord 27 preferably formed of non-corrosive wire and the upper end of this cord 27 is secured in any suitable fashion to the cylinder 24. For this purpose there is illustrated a piercing of the cylinder wall at 28 by the cord 27 and a second piercing at 29 with the extreme end of the cord 27 being bent over. If desired this cord 27 may be soldered also to the cylinder 24. The lower end of the cord 27 may be suitably formed so that it can be connected to a length of line to which a fish hook may also be connected and for this purpose there is shown a standard barrel swivel 31 connected to the cord 27 by suitably twisting this cord.

Referring especially to FIG. 3, the spring 23 is compressed, bearing against the upper rolled shoulder 21 of the tube 18. It is held in this compressed condition by means of the latch wire 13 which is preferably formed with an off set 13a adjacent its lower end. If now the cord 27 is pulled downwardly the cylinder 24 will engage this off set portion 13a of the latch wire 13 and will force it inwardly until the latch wire is aligned with the interior of the tube 18. The latch wire having been released, the compression spring 23 then forces the tube 18 upwardly with a sharp jerking action. The cylinder 24 will then be closely adjacent to the upper shoulder 21 of the tube 18 and will be engaged by the tube 18 and also suddenly jerked upwardly. This in turn will cause the cord 27 to be jerked upwardly and any fishhook connected to the cord 27 will be jerked a corresponding amount. This jerking action caused by the mechanism, tends to set the hook in the mouth of the fish.

Figure 4:
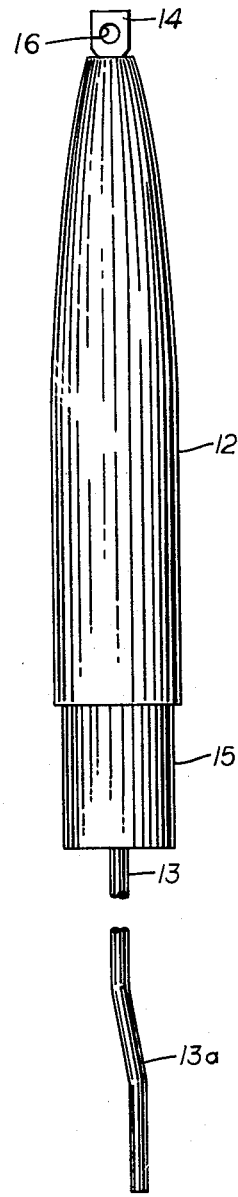

Referring now to FIG. 4, it will be noted that the lower end of the upper shell portion 12 is reduced in diameter as at 15 to slide within the upper end of the lower shell portion 11 as illustrated in FIG. 1. Any suitable means may be employed to secure these two shell portions together. At present it is preferred to make both shell portions out of organic plastic material and a simple adhesive may be applied to the joint before assembly thereby locking the two shell portions together.

Figure 2:
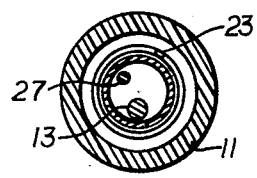
FIG. 2 is a cross sectional view on an enlarged scale along the line II—II of FIG. 1.

Considering now the operation of the device, the upper end of the entire assembly (FIG. 1) may be connected by means of the hole 16 to the fishline leading to the fisherman's rod or to the fisherman in the case of a hand held line. The device is cocked by pulling downwardly on the tube 18 until its upper shoulder 21 passes the bottom end of the latch wire 13 whereupon the latch wire springs to one side to engage the collar 21 as shown in FIG. 3. This then latches the tube 18 to an extended or cocked position against the compression of the spring 23. Cylinder 24 which acts as a latch release is spaced upwardly as shown in FIG. 2. If now a fish pulls upon the fishhook as by nibbling on the bait on the fishhook then this pull will be transmitted through the cord 27 to the cylinder 24 pulling it downwardly. As best illustrated in FIG. 3, it will be realized that the cylinder 24 will force the off-set end 13a of the latch wire 13 toward the interior of the tube 18 and when it is completely clear of the shoulder 21 the tube 18 will snap upwardly. This upward movement engages the cylinder 24 pulling it upwardly which in turn pulls on the cord 27 jerking the fishhook to set the hook in the fish's mouth. It is this hook-setting action which causes this device to be named a fish catcher.

It will be appreciated by those skilled in the art that any separate means could be used to connect the shell of the device to the fisherman's fishline. However, the use of the upper end of the latch wire 13 as a connector, not only makes the construction simpler but also serves as a convenient means for anchoring the wire 13 in the shell. The upper end of the wire 13 thus serves the dual purpose of anchoring the wire and providing the means for connecting the entire device to a fishline. Various types of bends may be used in the latch wire 13 and it is not strictly necessary to use the offset 13a as a positioning of the wire 13, since to direct it to one side of the shell is sufficient. In the present case the kink 17 (FIG. 1) is preferably on the opposite side of the off-set 13a. If desired a general bend can be placed in the wire 13a to cause it to bear against the interior of the cylinder 24 when in a latching position as shown in FIG. 3. Accordingly, the precise shape and initial bend of the latch wire 13 may be varied in numerous fashions. Likewise, the outer shell may be made of any suitable structural material. It has been found in practice that it is necessary to have appreciable clearances between the shoulders 21 and 26 on the tubes 18 and 24, respectively, inasmuch as water completely fills the interior of the device and the clearance avoids hydraulic damping. For best results non-corrosive materials such as stainless steel, brass, or other materials such as Monel wire are used to prolong life and working efficiency of the device.

While the invention has been described with respect to a specific embodiment thereof it will be appreciated by those skilled in the art that various modifications and adaptations may be employed. Accordingly, all such modifications and improvements that fall within the true spirit and scope of the invention are included in the following claims.

What is claimed is:

1. A fish catcher wherein one end is connected to a fish line controlled by a fisherman and the other end is connected to a fishhook comprising; an elongated shell; means on one end for connecting to a fishline; a tube reciprocable in and out the other end of the shell from an extended cocked position to a telescoped released position, said tube having an inner end; spring means urging said tube into said shell; a resilient latch wire secured to the shell and having an intermediate bent portion and having a free end disposed inside the shell and lengthwise of the shell, and said free end positioned to normally engage the inner end of the tube when the tube is in cocked position; a latch release reciprocable inside said shell and surrounding said latch wire and to engage the bent portion of said latch wire to force the free end to a position aligned with the inside of said tube; and means for connecting the latch release to a fishhook; whereby a pull on the fish hook will cause said latch release to disengage the free end of said latch wire from the inner end of the tube to permit the spring means to impact the tube against the latch release to jerk the fish hook.

2. The fish catcher of claim 1 in which the latch release is a cylinder surrounding the latch wire, and movement of said cylinder toward said other end of the shell centers the latch wire in the tube to release the tube which then reciprocates inwardly over said latch wire.

3. The fish catcher of claim 1 in which the means for connecting the latch release to the hook consists of a cord passing through the reciprocable tube.

4. The fish catcher of claim 1 in which the latch wire extends through said one end of the shell and is shaped to form said means for connecting the shell to a fish line.

5. The fish line catcher of claim 1 in which the shell is formed in two parts, one retaining the latch wire and the other the reciprocable tube, and the two parts are joined together to form the complete shell.

References Cited by the Examiner

UNITED STATES PATENTS

| 1,012,899 | 12/11 | Nelson | 43—15 |
| 2,144,175 | 1/39 | Zonn | 43—15 |
| 2,374,752 | 5/45 | Johnson | 43—15 |
| 2,479,399 | 8/49 | Patten | 43—15 |
| 2,624,971 | 1/53 | Norton | 43—16 |

SAMUEL KOREN, *Primary Examiner.*